(12) United States Patent
Ferguson et al.

(10) Patent No.: US 9,910,439 B1
(45) Date of Patent: *Mar. 6, 2018

(54) POSITIONING VEHICLES TO IMPROVE QUALITY OF OBSERVATIONS AT INTERSECTIONS

(71) Applicant: Waymo LLC, Mountain View, CA (US)

(72) Inventors: David Ian Franklin Ferguson, San Francisco, CA (US); Nathaniel Fairfield, Mountain View, CA (US); Bradley Templeton, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 107 days.

This patent is subject to a terminal disclaimer.

(21) Appl. No.: 15/006,657

(22) Filed: Jan. 26, 2016

Related U.S. Application Data

(63) Continuation of application No. 14/193,674, filed on Feb. 28, 2014, now Pat. No. 9,280,156, which is a continuation of application No. 13/441,800, filed on Apr. 6, 2012, now Pat. No. 8,712,624.

(51) Int. Cl.
*G01C 22/00* (2006.01)
*G05D 1/00* (2006.01)
*G05D 1/02* (2006.01)

(52) U.S. Cl.
CPC ......... *G05D 1/0212* (2013.01); *G05D 1/0088* (2013.01)

(58) Field of Classification Search
CPC .......................... G05D 1/0212; G05D 1/0088

USPC .......................................................... 701/25
See application file for complete search history.

(56) References Cited

U.S. PATENT DOCUMENTS

| | | | | |
|---|---|---|---|---|
| 5,349,533 A | * | 9/1994 | Libby | B25J 9/1666 318/587 |
| 5,963,148 A | * | 10/1999 | Sekine | G01C 21/26 340/905 |
| 6,151,539 A | * | 11/2000 | Bergholz | G01S 13/931 340/435 |
| 7,979,172 B2 | * | 7/2011 | Breed | G08G 1/161 701/117 |

(Continued)

*Primary Examiner* — Calvin Cheung
*Assistant Examiner* — Paula L Schneider
(74) *Attorney, Agent, or Firm* — McDonnell Boehnen Hulbert & Berghoff LLP

(57) ABSTRACT

Disclosed herein are methods and apparatus for controlling autonomous vehicles utilizing maps that include visibility information. A map is stored at a computing device associated with a vehicle. The vehicle is configured to operate in an autonomous mode that supports a plurality of driving behaviors. The map includes information about a plurality of roads, a plurality of features, and visibility information for at least a first feature in the plurality of features. The computing device queries the map for visibility information for the first feature at a first position. The computing device, in response to querying the map, receives the visibility information for the first feature at the first position. The computing device selects a driving behavior for the vehicle based on the visibility information. The computing device controls the vehicle in accordance with the selected driving behavior.

20 Claims, 5 Drawing Sheets

(56) References Cited

U.S. PATENT DOCUMENTS

| | | | | |
|---|---|---|---|---|
| 8,031,062 | B2* | 10/2011 | Smith | G08G 1/0962 |
| | | | | 340/438 |
| 8,364,398 | B2* | 1/2013 | Rossio | G01C 21/3644 |
| | | | | 340/988 |
| 8,712,624 | B1* | 4/2014 | Ferguson | B60W 30/18154 |
| | | | | 701/117 |
| 9,280,156 | B1 | 3/2016 | Ferguson et al. | |
| 2007/0124072 | A1* | 5/2007 | Nakayama | G01C 21/3658 |
| | | | | 701/431 |
| 2008/0162027 | A1* | 7/2008 | Murphy | B60W 50/14 |
| | | | | 701/117 |
| 2009/0118909 | A1* | 5/2009 | Rebut | B60Q 1/143 |
| | | | | 701/49 |
| 2010/0004856 | A1* | 1/2010 | Kobori | G01S 19/48 |
| | | | | 701/532 |
| 2010/0106356 | A1* | 4/2010 | Trepagnier | G01S 17/023 |
| | | | | 701/25 |

* cited by examiner

POSITIONING VEHICLES TO IMPROVE QUALITY OF OBSERVATIONS AT INTERSECTIONS

CROSS REFERENCE TO RELATED APPLICATIONS

The present application is a continuation of U.S. patent application Ser. No. 14/193,674, filed on Feb. 28, 2014, which is a continuation of U.S. patent application Ser. No. 13/441,800, filed on Apr. 6, 2012. The aforementioned applications are incorporated herein by reference.

BACKGROUND

Autonomous vehicles use various computing systems to aid in transporting passengers from one location to another. Some autonomous vehicles may require some initial input or continuous input from an operator, such as a pilot, driver, or passenger. Other systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

SUMMARY

In one aspect, a method is provided. A map is stored at a computing device associated with a vehicle. The vehicle is configured to operate in an autonomous operation mode that supports a plurality of driving behaviors. The map includes information about a plurality of roads, a plurality of features, and visibility information for at least a first feature in the plurality of features. The computing device queries the map for visibility information for the first feature at a first position. The computing device, in response to querying the map, receives the visibility information for the first feature at the first position. The computing device selects a driving behavior for the vehicle based on the visibility information. The computing device controls the vehicle in accordance with the selected driving behavior.

In another aspect, an article of manufacture is provided. The article of manufacture includes a non-transitory computer-readable storage medium having instructions stored thereon that, when executed by a processor, cause the processor to perform functions. The functions include: (a) storing a map for a vehicle, where the vehicle is configured to operate in an autonomous operation mode that supports a plurality of driving behaviors, and where the map comprises information about a plurality of roads, a plurality of features, and visibility information for at least a first feature in the plurality of features, (b) querying the map for visibility information for the first feature at a first position, (c) in response to the query, receiving the visibility information for the first feature at the first position, (d) selecting a driving behavior for the vehicle based on the visibility information, and (e) controlling the vehicle using the computing device in accordance with the selected driving behavior.

In still another aspect, a computing device is provided. The computing device includes a processor and a non-transitory computer readable medium having stored thereon instructions that, when executed by the processor, cause the computing device to perform functions. The functions include: (a) storing a map for a vehicle in the non-transitory computer-readable storage medium, where the vehicle is configured to operate in an autonomous operation mode that supports a plurality of driving behaviors, and where the map comprises information about a plurality of roads, a plurality of features, and visibility information for at least a first feature in the plurality of features, (b) querying the map for visibility information for the first feature at a first position, (c) in response to the query, receiving the visibility information for the first feature at the first position, (d) selecting a driving behavior for the vehicle based on the visibility information, and (e) controlling the vehicle in accordance with the selected driving behavior.

DETAILED DESCRIPTION

Figure 1:
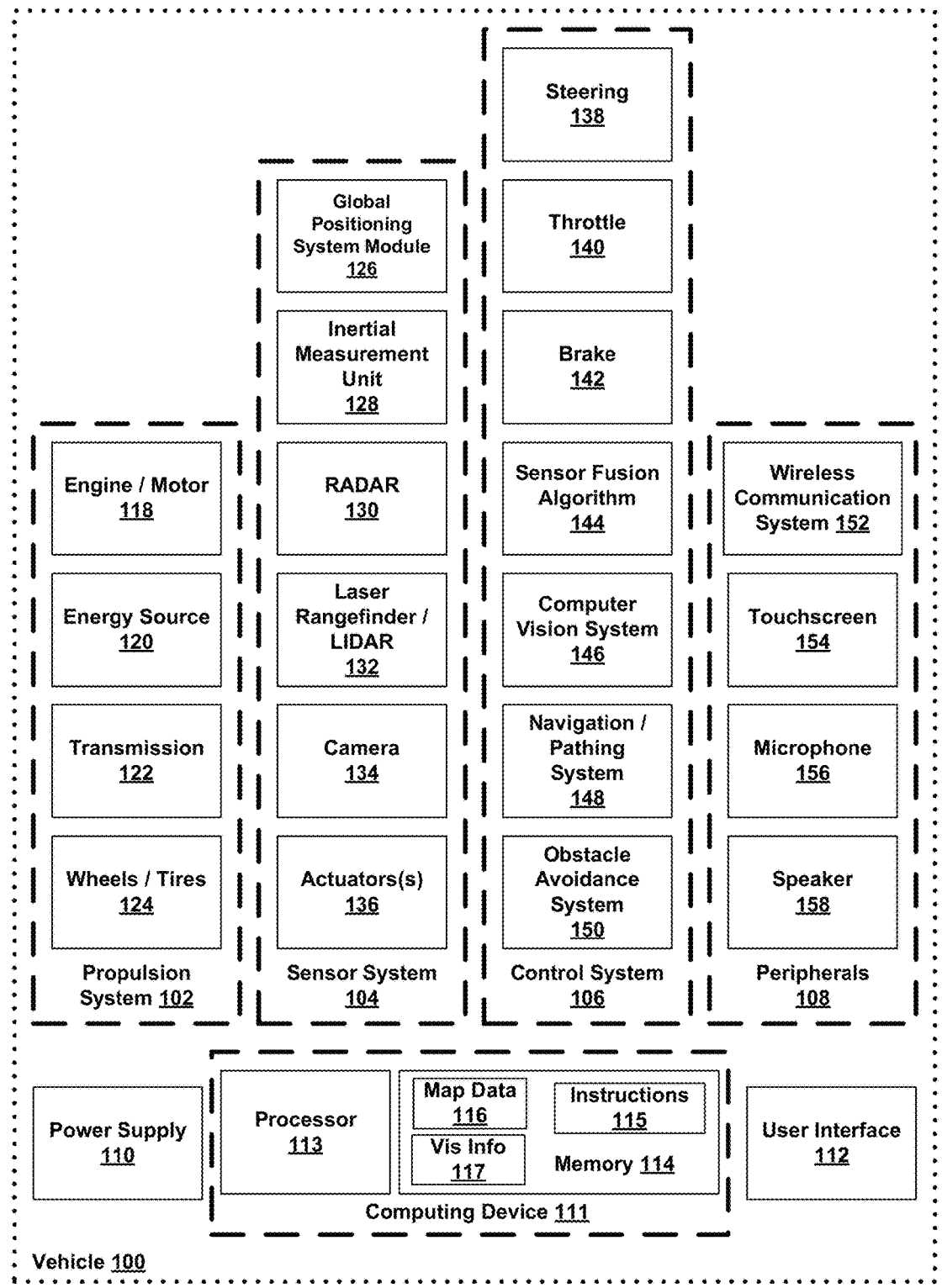
FIG. 1 is a simplified block diagram of an example vehicle, in accordance with an example embodiment.

A computing device can be programmed to be a vehicle control system that operates a vehicle autonomously or without a human driver being required to direct the vehicle along a route from a start to a destination. To control the vehicle, the vehicle control system can generate and select driving behaviors on the way to the destination. Example driving behaviors include one or a combination of: heading left/right, turning left/right, performing a U-turn, maintaining course and speed, increasing speed, decreasing speed, slowly moving forward, reversing direction, and stopping. Other driving behaviors are possible as well.

The vehicle control system may be implemented in or may take the form of a vehicle, such as an automobile. Alternatively, the vehicle control system may be implemented in or take the form of another vehicle, such as a truck, motorcycle, off-road vehicle, bus, boat, airplane, helicopter, lawn mower, recreational vehicle, amusement park vehicle, farm vehicle, construction vehicle, tram, golf cart, train, or trolley. Other vehicles can possibly be controlled by vehicle control systems as well.

To autonomously operate the vehicle, the computing device acting as the vehicle control system can estimate the current state of the environment surrounding the vehicle based on a number of inputs. A collection of inputs to the computing device generating and selecting driving behaviors can come from sensors on the vehicle. The sensors can provide information about features in the vehicle's driving environment, such as other vehicles, traffic signals and signs, directional information, locations, speeds, and acceleration, fuel information, vehicle status information, roads, intersections, lane information, lane boundaries, speed limits, and other features.

Another input to the computing device acting as the vehicle control system can be a map. The map can include location information for features along a road such as traffic signs, signals, buildings, parking lots, parks/natural areas, additional information about building and other locations along the road, road geometry information, lane information, and other information.

The map can include and/or be associated with visibility information for features at various places along a road. Visibility information for locations along the road can be generated, stored, and retrieved to aid navigation for the autonomous vehicle. This visibility information can be stored with the map and/or in data that is otherwise associated with the map, such as a database that can be queried with map coordinates, e.g., coordinates of an intersection, and return corresponding visibility information for the map coordinates. Once visibility information is calculated e.g., at a visibility calculation server, the visibility information can be stored and perhaps distributed to multiple autonomous vehicles. In some embodiments, the autonomous vehicle can query the visibility server for visibility information and/or maps during autonomous vehicle operation.

Intersections can pose particular challenges for autonomous vehicle operation. Intersections can have traffic lights that are partially or completely occluded, or blocked from view, by other vehicles, trees, buildings and other objects. Competing features at intersections, such as a number of simultaneously visible traffic lights, traffic signs, and non-traffic lights and signs, can make differentiating traffic-control features from non-traffic-control features challenging. Also, to safely navigate an intersection, an autonomous vehicle may view both a current lane and lanes of one or more cross streets.

To address these particular challenges, the visibility information can indicate, for a given lane at an intersection, which lane(s) provides the best view(s) of feature(s) at the intersection. The autonomous vehicle can query the map or associated data to get visibility information about an intersection, receive retrieved visibility information about the intersection, and use the retrieved visibility information to generate driving behavior(s), perhaps to improve viewing of feature(s) at the intersection. In some embodiments, the visibility information can include visibility information that indicates visibility information at one or more sub-lane positions within a lane.

For example, suppose the autonomous vehicle is in a right lane of a four-lane road and the visibility information from the map indicates that a traffic light at an upcoming intersection is best viewed from a left lane of the four-lane road. In response, the autonomous vehicle can generate driving behaviors to change to the left lane when safely possible. In some embodiments, the map can store a respective score for each valid position leading up to the intersection based on how well that position allows the vehicle to observe the features of the intersection. The score can be a combined score for a set of features at the intersection, or can include separate scores for each feature at the intersection.

By computing and storing visibility information ahead of time, the autonomous vehicle can simply query the map and/or associated data while navigating rather than needing to perform visibility calculations on-the-fly. Thus, computing resources that may have been used to calculate visibility information in real-time can be saved by using stored visibility information. Further, these computing resources can be being saved while approaching and/or navigating through an intersection, likely to be a critical time of autonomous vehicle operation during which computing resources may be heavily loaded.

Referring now to the Figures, FIG. 1 is a simplified block diagram of an example vehicle 100, in accordance with an example embodiment. Components coupled to or included in the vehicle 100 may include a propulsion system 102, a sensor system 104, a control system 106, peripherals 108, a power supply 110, a computing device 111, and a user interface 112. The computing device 111 may include a processor 113, and a memory 114. The memory 114 may include instructions 115 executable by the processor 113, and may also store map data 116. Components of the vehicle 100 may be configured to work in an interconnected fashion with each other and/or with other components coupled to respective systems. For example, the power supply 110 may provide power to all the components of the vehicle 100. The computing device 111 may be configured to receive information from and control the propulsion system 102, the sensor system 104, the control system 106, and the peripherals 108. The computing device 111 may be configured to generate a display of images on and receive inputs from the user interface 112.

Map data 116 can include information for one or more roads and features along the roads. The road information can include locations that the road travels through, connecting roads, intersections, road names and/or numbers, road geometry information, road size (e.g., one lane, two lanes, etc.), lane information, and other information. Features along the road can include but are not limited to any combination of traffic signs, traffic signals, other signs and signals, buildings, parking lots, parks/natural areas, historical markers, amenities, points-of-interest, businesses, and additional information about locations along the road.

Map data 116 can include and/or be associated with visibility information 117 for features at various places along a road. Visibility information 117 can be generated, stored, and retrieved to aid navigation for the autonomous vehicle. Visibility information 117 can be stored with map data 116, with data that is otherwise associated with the map, such as a database that can be queried with map coordinates for an intersection and return the corresponding visibility information for the intersection. Once visibility information is calculated e.g., at a visibility calculation server, the visibility information can be stored and distributed to multiple autonomous vehicles. In some embodiments, the autonomous vehicle can query the visibility server for visibility information and/or maps during autonomous vehicle operation.

In other examples, the vehicle 100 may include more, fewer, or different systems, and each system may include more, fewer, or different components. Additionally, the systems and components shown may be combined or divided in any number of ways.

The propulsion system 102 may may be configured to provide powered motion for the vehicle 100. As shown, the propulsion system 102 includes an engine/motor 118, an energy source 120, a transmission 122, and wheels/tires 124. The propulsion system 102 may additionally or alternatively include components other than those shown.

The engine/motor 118 may be or include any combination of an internal combustion engine, an electric motor, a steam engine, and a Stirling engine. Other motors and engines are possible as well. In some examples, the propulsion system 102 could include multiple types of engines and/or motors. For instance, a gas-electric hybrid car could include a gasoline engine and an electric motor. Other examples are possible.

The energy source 120 may be a source of energy that powers the engine/motor 118 in full or in part. That is, the engine/motor 118 may be configured to convert the energy source 120 into mechanical energy. Examples of energy sources 120 include gasoline, diesel, other petroleum-based fuels, propane, other compressed gas-based fuels, ethanol, solar panels, batteries, and other sources of electrical power. The energy source(s) 120 could additionally or alternatively include any combination of fuel tanks, batteries, capacitors, and/or flywheels. In some examples, the energy source 120 may provide energy for other systems of the vehicle 100 as well.

The transmission 122 may be configured to transmit mechanical power from the engine/motor 118 to the wheels/tires 124. To this end, the transmission 122 may include a gearbox, clutch, differential, drive shafts, and/or other elements. In examples where the transmission 122 includes drive shafts, the drive shafts could include one or more axles that are configured to be coupled to the wheels/tires 124.

The wheels/tires 124 of vehicle 100 could be configured in various formats, including a unicycle, bicycle/motorcycle, tricycle, or car/truck four-wheel format. Other wheel/tire formats are possible as well, such as those including six or more wheels. The wheels/tires 124 of vehicle 100 may be configured to rotate differentially with respect to other wheels/tires 124. In some examples, the wheels/tires 124 may include at least one wheel that is fixedly attached to the transmission 122 and at least one tire coupled to a rim of the wheel that could make contact with the driving surface. The wheels/tires 124 may include any combination of metal and rubber, or combination of other materials.

The sensor system 104 may include a number of sensors configured to sense information about an environment in which the vehicle 100 is located. As shown, the sensors of the sensor system include a Global Positioning System (GPS) module 126, an inertial measurement unit (IMU) 128, a RADAR unit 130, a laser rangefinder and/or LIDAR unit 132, a camera 134, and actuators 136 configured to modify a position and/or orientation of the sensors. The sensor system 104 may include additional sensors as well, including, for example, sensors that monitor internal systems of the vehicle 100 (e.g., an oxygen monitor, a fuel gauge, an engine oil temperature, etc.). The sensor system 104 may additionally or alternatively include components other than those shown. Other sensors are possible as well The GPS module 126 may be any sensor configured to estimate a geographic location of the vehicle 100. To this end, the GPS module 126 may include a transceiver configured to estimate a position of the vehicle 100 with respect to the Earth, based on satellite-based positioning data. In an example, the computing device 111 may be configured to use the GPS module 126 in combination with the map data 116 to estimate a location of a lane boundary on road on which the vehicle 100 may be travelling on. The GPS module 126 may take other forms as well.

The IMU 128 may be any combination of sensors configured to sense position and orientation changes of the vehicle 100 based on inertial acceleration. In some examples, the combination of sensors may include, for example, accelerometers and gyroscopes. Other combinations of sensors are possible as well.

The RADAR 130 unit may be any sensor configured to sense objects in the environment in which the vehicle 100 is located using radio signals. In some examples, in addition to sensing the objects, the RADAR unit 130 may additionally be configured to sense the speed and/or direction of motion of the objects.

Similarly, the laser rangefinder or LIDAR unit 132 may be any sensor configured to sense objects in the environment in which the vehicle 100 is located using lasers. In particular, the laser rangefinder or LIDAR unit 132 may include a laser source and/or laser scanner configured to emit a laser and a detector configured to detect reflections of the laser. The laser rangefinder or LIDAR 132 may be configured to operate in a coherent (e.g., using heterodyne detection) or an incoherent detection mode.

The camera 134 may be any camera (e.g., a still camera, a video camera, etc.) configured to capture images of the environment in which the vehicle 100 is located. To this end, the camera may take any of the forms described above.

The control system 106 may be configured to control operation of the vehicle 100 and its components. To this end, the control system 106 may include a steering unit 138, a throttle 140, a brake unit 142, a sensor fusion algorithm 144, a computer vision system 146, a navigation or pathing system 148, and an obstacle avoidance system 150.

The steering unit 138 may be any combination of mechanisms configured to adjust the heading or direction of the vehicle 100. The throttle 140 may be any combination of mechanisms configured to control the operating speed and acceleration of the engine/motor 118 and, in turn, the speed and acceleration of the vehicle 100.

The brake unit 142 may be any combination of mechanisms configured to decelerate the vehicle 100. For example, the brake unit 142 may use friction to slow the wheels/tires 124. As another example, the brake unit 142 may be configured to be regenerative and convert the kinetic energy of the wheels/tires 124 to electric current. The brake unit 142 may take other forms as well.

The sensor fusion algorithm 144 may include an algorithm (or a computer program product storing an algorithm) executable by the computing device 111, for example. The sensor fusion algorithm 144 may be configured to accept data from the sensor system 104 as an input. The data may include, for example, data representing information sensed at the sensors of the sensor system 104. The sensor fusion algorithm 144 may include, for example, a Kalman filter, a Bayesian network, or another algorithm. The sensor fusion algorithm 144 may further be configured to provide various assessments based on the data from the sensor system 104, including, for example, evaluations of individual objects and/or features in the environment in which the vehicle 100 is located, evaluations of particular situations, and/or evaluations of possible impacts based on particular situations. Other assessments are possible as well The computer vision system 146 may be any system configured to process and analyze images captured by the camera 134 in order to identify objects and/or features in the environment in which the vehicle 100 is located, including, for example, lane information, traffic signals and obstacles. To this end, the computer vision system 146 may use an object recognition algorithm, a Structure from Motion (SFM) algorithm, video tracking, or other computer vision techniques. In some examples, the computer vision system 146 may additionally be configured to map the environment, track objects, estimate the speed of objects, etc.

The navigation and pathing system 148 may be any system configured to determine a driving path for the vehicle 100. The navigation and pathing system 148 may additionally be configured to update the driving path dynamically while the vehicle 100 is in operation. In some examples, the navigation and pathing system 148 may be configured to incorporate data from the sensor fusion algorithm 144, the GPS module 126, and one or more predetermined maps so as to determine the driving path for the vehicle 100.

The obstacle avoidance system 150 may be any system configured to identify, evaluate, and avoid or otherwise negotiate obstacles in the environment in which the vehicle 100 is located.

The control system 106 may additionally or alternatively include components other than those shown.

Peripherals 108 may be configured to allow the vehicle 100 to interact with external sensors, other vehicles, and/or a user. To this end, the peripherals 108 may include, for example, a wireless communication system 152, a touchscreen 154, a microphone 156, and/or a speaker 158.

The wireless communication system 152 may be any system configured to be wirelessly coupled to one or more other vehicles, sensors, or other entities, either directly or via a communication network. To this end, the wireless communication system 152 may include an antenna and a chipset for communicating with the other vehicles, sensors, or other entities either directly or over an air interface. The chipset or wireless communication system 152 in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 152 may take other forms as well.

The touchscreen 154 may be used by a user to input commands to the vehicle 100. To this end, the touchscreen 154 may be configured to sense at least one of a position and a movement of a user's finger via capacitive sensing, resistance sensing, or a surface acoustic wave process, among other possibilities. The touchscreen 154 may be capable of sensing finger movement in a direction parallel or planar to the touchscreen surface, in a direction normal to the touchscreen surface, or both, and may also be capable of sensing a level of pressure applied to the touchscreen surface. The touchscreen 154 may be formed of one or more translucent or transparent insulating layers and one or more translucent or transparent conducting layers. The touchscreen 154 may take other forms as well The microphone 156 may be configured to receive audio (e.g., a voice command or other audio input) from a user of the vehicle 100. Similarly, the speakers 158 may be configured to output audio to the user of the vehicle 100.

The peripherals 108 may additionally or alternatively include components other than those shown.

The power supply 110 may be configured to provide power to some or all of the components of the vehicle 100. To this end, the power supply 110 may include, for example, a rechargeable lithium-ion or lead-acid battery. In some examples, one or more banks of batteries could be configured to provide electrical power. Other power supply materials and configurations are possible as well. In some examples, the power supply 110 and energy source 120 may be implemented together, as in some all-electric cars.

The processor 113 included in the computing device 111 may comprise one or more general-purpose processors and/or one or more special-purpose processors. To the extent the processor 113 includes more than one processor; such processors could work separately or in combination. The computing device 111 may be configured to control functions of the vehicle 100 based on input received through the user interface 112, for example.

The memory 114, in turn, may comprise one or more volatile and/or one or more non-volatile storage components, such as optical, magnetic, and/or organic storage, and the memory 114 may be integrated in whole or in part with the processor 113. The memory 114 may contain the instructions 115 (e.g., program logic) executable by the processor 113 to execute various vehicle functions.

The components of the vehicle 100 could be configured to work in an interconnected fashion with other components within and/or outside their respective systems. To this end, the components and systems of the vehicle 100 may be communicatively linked together by a system bus, network, and/or other connection mechanism (not shown).

Further, while each of the components and systems are shown to be integrated in the vehicle 100, in some examples, one or more components or systems may be removably mounted on or otherwise connected (mechanically or electrically) to the vehicle 100 using wired or wireless connections.

The vehicle 100 may include one or more elements in addition to or instead of those shown. For example, the vehicle 100 may include one or more additional interfaces and/or power supplies. Other additional components are possible as well. In these examples, the memory 114 may further include instructions executable by the processor 113 to control and/or communicate with the additional components.

Figure 2:
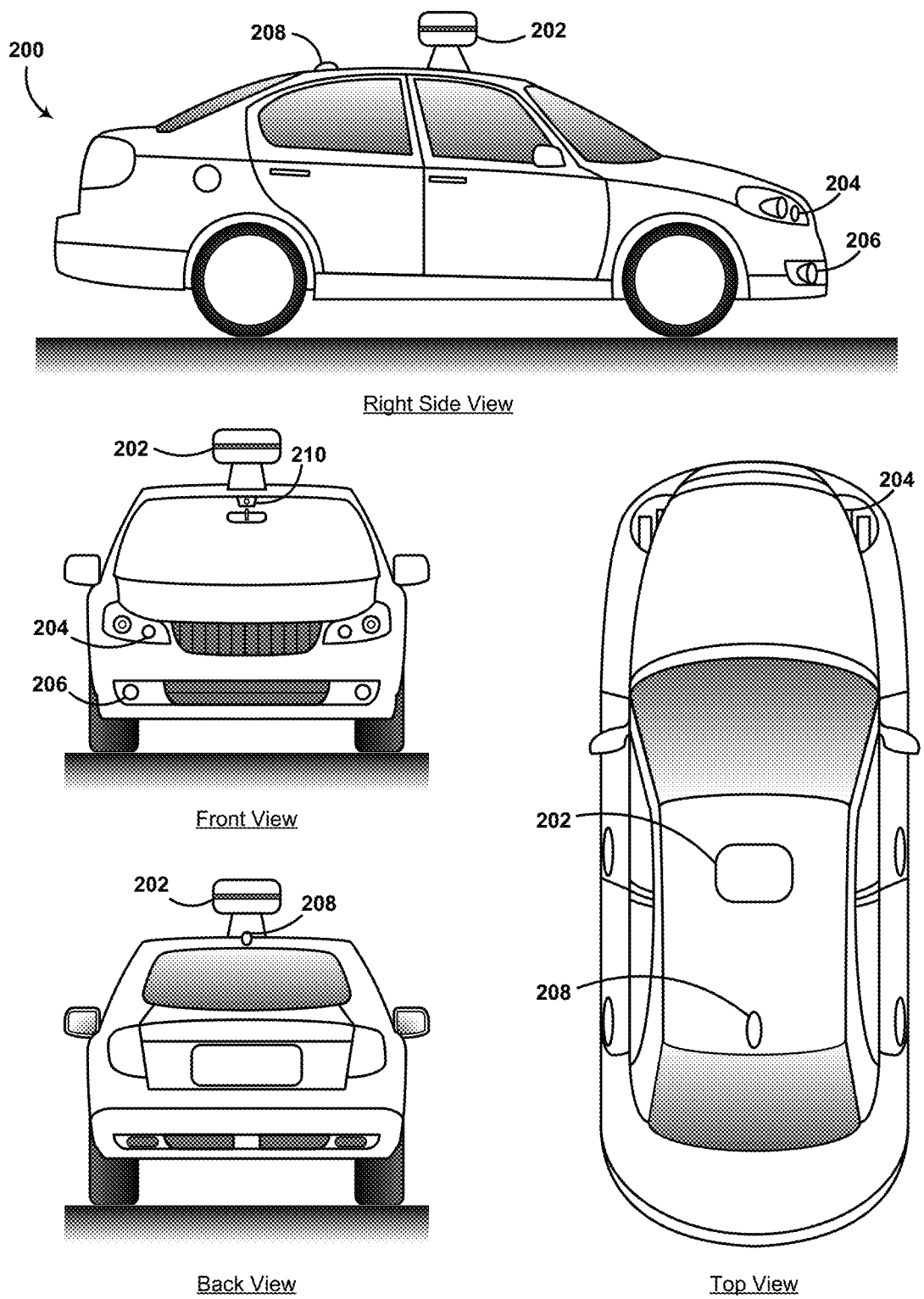
FIG. 2 illustrates an example vehicle, in accordance with an example embodiment.

FIG. 2 illustrates an example vehicle 200, in accordance with an embodiment. In particular, FIG. 2 shows a Right Side View, Front View, Back View, and Top View of the vehicle 200. Although vehicle 200 is illustrated in FIG. 2 as an automobile, other examples are possible. For instance, the vehicle 200 could represent a truck, motorcycle, off-road vehicle, bus, boat, airplane, helicopter, lawn mower, recreational vehicle, amusement park vehicle, farm vehicle, construction vehicle, tram, golf cart, train, trolley, or some other vehicle. As shown, the vehicle 200 includes a first sensor unit 202, a second sensor unit 204, a third sensor unit 206, a wireless communication system 208, and a camera 210. In some embodiments, vehicle 200 can include one or more other components in addition to or instead of those shown.

Each of the first, second, and third sensor units 202-206 may include any combination of global positioning system sensors, inertial measurement units, RADAR units, laser rangefinders, LIDAR units, cameras, lane detection sensors, and acoustic sensors. Other types of sensors are possible as well.

While the first, second, and third sensor units 202 are shown to be mounted in particular locations on the vehicle 200, in some examples the sensor unit 202 may be mounted elsewhere on the vehicle 200, either inside or outside the vehicle 200. Further, while only three sensor units are shown, in some examples more or fewer sensor units may be included in the vehicle 200.

In some examples, one or more of the first, second, and third sensor units 202-206 may include one or more movable mounts on which the sensors may be movably mounted. The movable mount may include, for example, a rotating platform. Sensors mounted on the rotating platform could be rotated so that the sensors may obtain information from each direction around the vehicle 200. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some examples, one or more of the first, second, and third sensor units 202-206 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 208 may be any system configured to wirelessly couple to one or more other vehicles, sensors, or other entities, either directly or via a communication network as described above with respect to the wireless communication system 152 in FIG. 1. While the wireless communication system 208 is shown to be positioned on a roof of the vehicle 200, in other examples the wireless communication system 208 could be located, fully or in part, elsewhere.

The camera 210 may be any camera (e.g., a still camera, a video camera, etc.) configured to capture images of the environment in which the vehicle 200 is located. To this end, the camera 210 may be configured to detect visible light, or may be configured to detect light from other portions of the spectrum, such as infrared or ultraviolet light, or x-rays. Other types of cameras are possible as well. The camera 210 may be a two-dimensional detector, or may have a three-dimensional spatial range. In some examples, the camera 210 may be, for example, a range detector configured to generate a two-dimensional image indicating a distance from the camera 210 to a number of points in the environment. To this end, the camera 210 may use one or more range detecting techniques. For example, the camera 210 may use a structured light technique in which the vehicle 200 illuminates an object in the environment with a predetermined light pattern, such as a grid or checkerboard pattern and uses the camera 210 to detect a reflection of the predetermined light pattern off the object. Based on distortions in the reflected light pattern, the vehicle 200 may determine the distance to the points on the object. The predetermined light pattern may comprise infrared light, or light of another wavelength.

As another example, the camera 210 may use a laser scanning technique in which the vehicle 200 emits a laser and scans across a number of points on an object in the environment. While scanning the object, the vehicle 200 uses the camera 210 to detect a reflection of the laser off the object for each point. Based on a length of time it takes the laser to reflect off the object at each point, the vehicle 200 may determine the distance to the points on the object.

As yet another example, the camera 210 may use a time-of-flight technique in which the vehicle 200 emits a light pulse and uses the camera 210 to detect a reflection of the light pulse off an object at a number of points on the object. In particular, the camera 210 may include a number of pixels, and each pixel may detect the reflection of the light pulse from a point on the object. Based on a length of time it takes the light pulse to reflect off the object at each point, the vehicle 200 may determine the distance to the points on the object. The light pulse may be a laser pulse, for example. Other range detecting techniques are possible as well, including stereo triangulation, sheet-of-light triangulation, interferometry, and coded aperture techniques, among others. The camera 210 may take other forms as well.

In some examples, the camera 210 may include a movable mount and/or an actuator configured to adjust the position and/or orientation of the camera 210. While FIG. 2 shows camera 210 mounted inside a front windshield of the vehicle 200, in other examples the camera 210 may be mounted elsewhere on the vehicle 200, either inside or outside the vehicle 200.

A control system of the vehicle 200 may be configured to control the vehicle 200 in accordance with a given driving behavior from among multiple possible driving behaviors. The control system may be configured to receive information from sensors coupled to the vehicle 200 (on or off the vehicle 200), select a driving behavior based on the information, and control the vehicle 200 in accordance with the selected driving behavior. The control system further may be configured to continuously monitor the information received from the sensors to continuously evaluate driving conditions and also may be configured to modify the driving behavior or select another driving behavior based on changes in the driving conditions.

Figure 3:
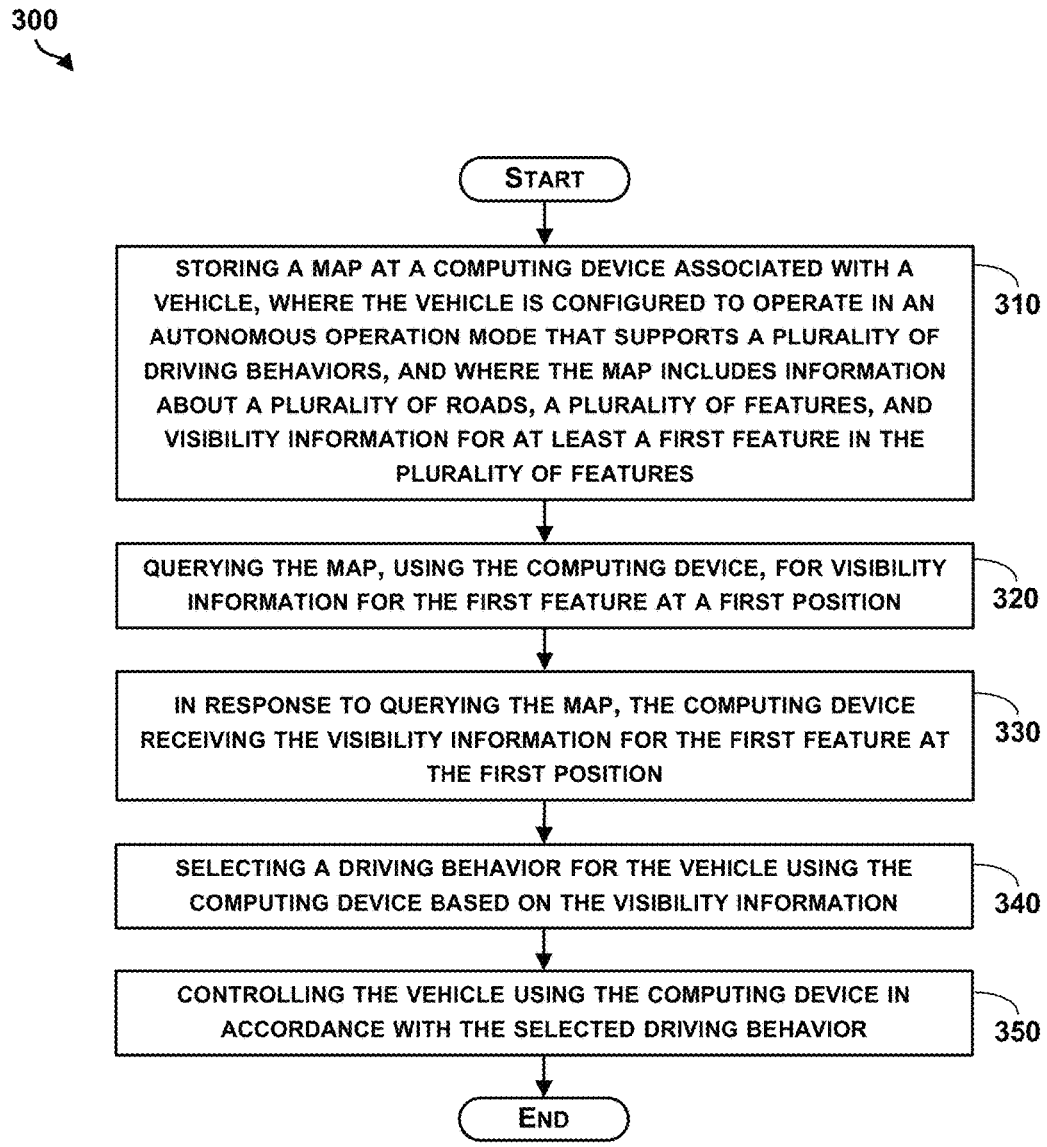
FIG. 3 is a flow chart illustrating a method, in accordance with an example embodiment.

FIG. 3 is a flow chart illustrating an example method 300. In this example, method 300 begins at block 310, where a map can be stored at a computing device associated with a vehicle. The vehicle can be configured to operate in an autonomous operation mode that supports a plurality of driving behaviors. The map can include information about a plurality of roads, a plurality of features, and visibility information for at least a first feature in the plurality of features.

In some embodiments, the first position can be associated with an intersection of at least two roads in the plurality of roads. In other embodiments, the first position can be associated with a lane position on a road in the plurality of roads, where the lane position is associated with a lane of the road. In particular of these other embodiments, the first position can be associated with both the lane position and a sub-lane position within the lane of the road.

In still other embodiments, the first feature is associated with a first traffic control device. In particular of the still other embodiments, the first traffic control device is further associated with a second feature, where the first feature includes a traffic light and the second feature includes a turn-control signal.

At block 320, the computing device can query the map for visibility information for the first feature at a first position. In some embodiments, the visibility information can be stored with the map, while in other embodiments, the visibility information can be stored in data associated with the map, such as a visibility-information database configured to be queried based on map coordinates, or other reference(s) to the map.

In still other embodiments, the visibility information can include a visibility index, perhaps a numerical visibility index. In particular of the still other embodiments, the first position can be associated with a plurality of sub-positions, and where the visibility index can include an ordering of best-to-worst sub-positions at the first location.

In yet other embodiments, querying the map for visibility information for the first feature can include querying the map for visibility information for the first feature based on a time of day. In even other embodiments, the visibility information of the first feature at the first position can be based on an occluding object associated with the first feature.

At block 330, the computing device can, in response to querying the map, receive the visibility information for the first feature at the first position.

At block 340, the computing device can select a driving behavior for the vehicle based on the visibility information. Example driving behaviors include but are not limited to, one or a combination of: heading left/right, turning left/right, performing a U-turn, maintaining course and speed, increasing speed, decreasing speed, slowly moving forward, reversing direction, and stopping.

At block 350, the computing device can control the vehicle in accordance with the selected driving behavior.

Figure 4A:
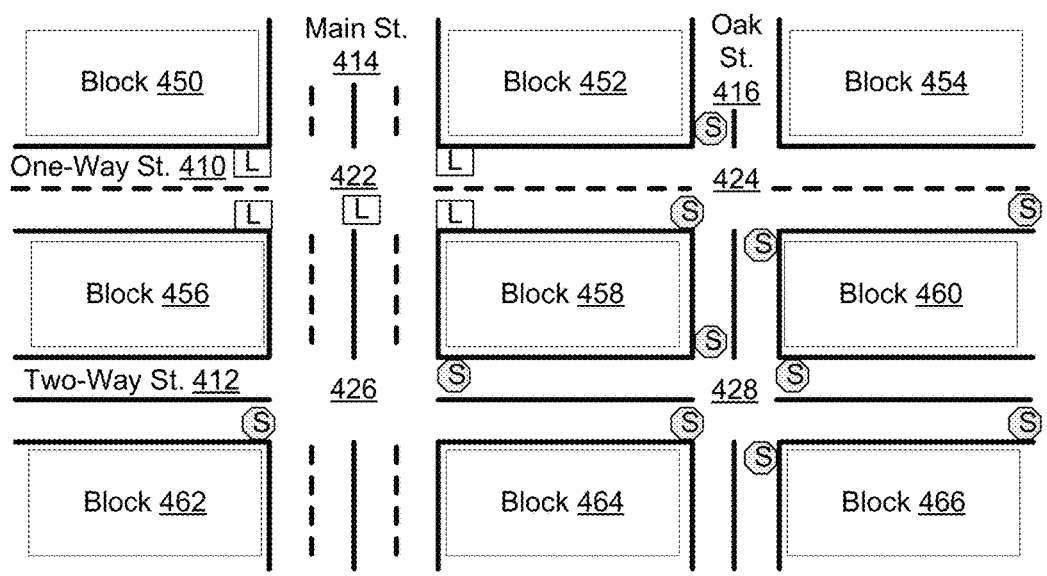
FIG. 4A shows an example map with blocks separated with north-south roads and east-west roads, in accordance with an example embodiment.

FIG. 4A shows an example map 400 with nine blocks 450-466 separated by north-south roads Main St. 414 and Oak St. 416 and east-west roads One Way St. 410 and Two-Way St. 412. The north-south roads and east-west roads make four intersections 422, 424, 426, and 428. Intersection 422 between One-Way St. 410 and Main St. 414 includes several traffic lights, shown with boxes surrounding the letter "L" on FIG. 4A. Intersections 424, 426, and 428 respectively have three, two, and four stop signs for traffic control. Each stop sign is shown on FIG. 4A as an octagon surrounding the letter "S".

The autonomous vehicle can use visibility information to position itself to observe key information at each intersection. For example, visibility information can include data at various lane positions that indicates which lane position provides the best view of features at each intersection. These features can include but are not limited to any combination of traffic signs, traffic signals, other signs and signals, buildings, parking lots, parks/natural areas, historical markers, amenities, points-of-interest, businesses, and additional information about locations associated with the intersection. Other features are possible as well.

This visibility information can be stored with the map and/or in data that is otherwise associated with the map, such as a database that can be queried with map coordinates for an intersection and return the corresponding visibility information for the intersection. By computing and storing visibility information ahead of time, the autonomous vehicle can simply query the map and/or associate data while navigating rather than needing to perform visibility calculations on-the-fly to estimate the best lane position for visibility and perhaps whether or not a current lane position will suffice.

Figure 4B:
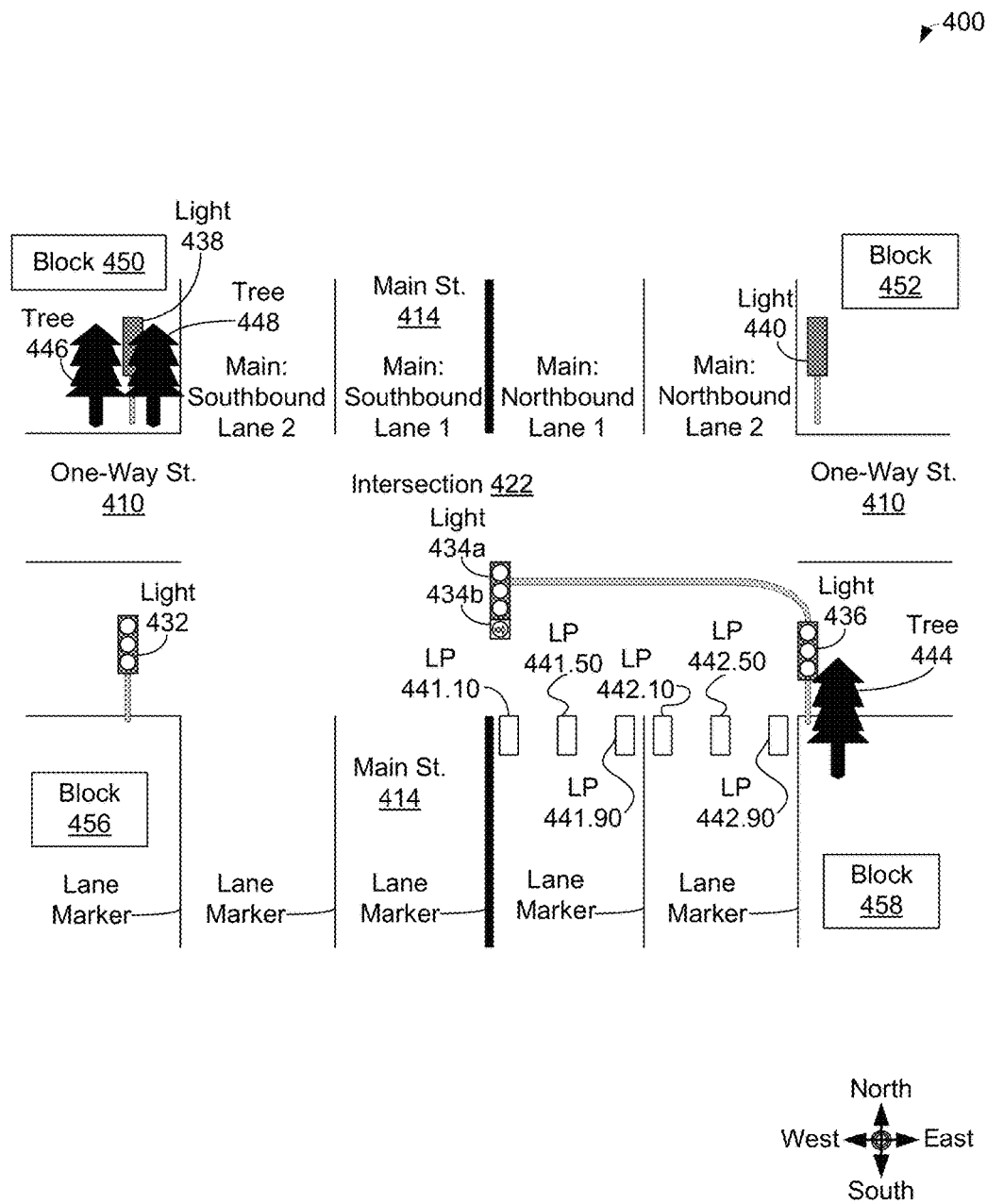
FIG. 4B shows a close-up view of an intersection of the example map shown in FIG. 4A, in accordance with an example embodiment.

FIG. 4B shows a close-up view of intersection 422 of map 400. Intersection 422 is an intersection between One-way St. 410 and Main St. 414, with five traffic lights 432, 434, 436, 438, and 440. Light 434 can be further sub-divided into two features: vertical traffic lights 434a and right-turn signal 434b. FIG. 1B shows that Main St. has 4 lanes: Southbound Lanes 1 and 2, and Northbound Lanes 1 and 2.

In some embodiments, a position within a lane of a road can be termed to be a lane position of the road. For example, Main St. has four lane positions: Southbound Lane 1, Southbound Lane 2, Northbound Lane 1, and Northbound Lane 2. Further, a lane position can be divided into sub-positions. FIG. 4B shows various lane positions and sub-lane positions on the south side of intersection 422. Lane Position (LP) 441.10 shows a position in Northbound Lane 1 approximately $1/10^{th}$ of the way between the left-side lane marker (shown as a thick dark line on FIG. 4B) and the right-side lane marker separating Northbound Lanes 1 and 2. LPs 441.50 and 441.90 respectively show positions in Northbound Lane 1 approximately halfway and approximately $9/10^{th}$ of the way between the left-side and right-side lane markers. Similarly LPs 442.10, 442.50, and 442.90 respectively show positions in Northbound Lane 2 approximately $1/10^{th}$, halfway, and $9/10^{th}$ of the way between the left-side and right-side lane markers.

Visibility information can be calculated for each feature visible at each lane position and sub-lane position. At LP 441.10, looking northward, visible features include One-Way St. 410, Main St. 414, intersection 422, lights 432, 434a, 434b, 436, 438, 440, trees 444, 446, 448, and blocks 450 and 452.

Example visibility information for feature 434b at lane positions 441.10-442.90 is shown in Table 1 below. The visibility information shown in Table 1 is expressed as a visibility index expressing a visibility value from 0 (cannot be seen) to 10 (wholly visible).

TABLE 1

| Lane Position (LP) | Visibility Index of Feature 434b |
|---|---|
| 441.10 | 9.9 |
| 441.50 | 9.8 |
| 441.90 | 9.5 |
| 442.10 | 9.4 |
| 442.50 | 9.3 |
| 442.90 | 9.0 |

Upon retrieving the stored visibility information, the autonomous vehicle can move into the most-visible lane on its approach to the intersection, if feasible based on traffic conditions, desired routing, and perhaps other criteria. Once the autonomous vehicle gets in the most-visible lane, the autonomous vehicle can get a more reliable estimate of key information, such as a state of the traffic light (e.g., red, green or yellow) and locations of other vehicles.

At some positions, some or all features can be occluded, or blocked, from view by an occluding object. FIG. 4B shows that tree 448 can occlude a view of light 438 from lane positions 442.10 through 442.90. In contrast, at position 441.10, light 438 may be partially visible between trees 446 and 448. In these cases, a visibility index at position 442.90 of feature light 438 can be 0, with an indication of occlusion by trees 448. Then, if tree 448 is no longer near light 438, such as being downed by natural or human causes, the visibility index of light 438 can be updated to be greater than zero and the indication of occlusion can be removed.

In some embodiments, the map and/or associated data may store where in a particular lane (e.g., slightly to left or right) the vehicle should try to be in order to get better information regarding the intersection, etc. One possible implementation is to store a score associated with every possible (legal) position leading up to the intersection (in all lanes) based on how well that position allows the vehicle to observe the key features of the intersection. Another possible implementation can store a "relative score"; e.g., visibility for feature F at location L improves as the vehicle moves east, visibility for feature F1 at location L1 degrades as the vehicle moves west or south, visibility for feature F2 at location L2 degrades as the vehicle moves north toward occluding object OO but improves as the vehicle passes and continues to move north past occluding object OO. In some embodiments, visibility information can be or include a binary indication of whether a feature F is visible or not visible at a particular location. In other embodiments, the visibility information can be stored as an ordered list of best-to-worst locations.

In particular embodiments, visibility information can be stored for points along the road as well. For example, the visibility information can be stored at distance-based intervals along the road e.g., every 200 yards, or 0.5 km, at points where the visibility changes a relatively-large amount such as going into and/or leaving a bend in a road, as features become visible along the road, and/or based on other criteria.

A visibility calculation can take several criteria into account: time of day, temporary road hazards (e.g., effects of road construction), occluding features such as nearby-vegetation and bright lights, road conditions, traffic patterns, weather-related conditions, and/or other criteria. For example, a feature F4 may be visible at a location L4 traveling in a direction D during daylight and nighttime hours, but F4 is not readily visible at L4 traveling in direction D from a time about one half hour before sunset until dusk, due to sensors being in direct sunlight at L4 looking in direction D at F4. As such, the visibility information can indicate that visibility of F4 from L4 is relatively low during a time interval.

Stored visibility information may include environmental lighting information, such as sunset/sunrise information, moon-phase information, etc. For example, use of a sunset/sunrise table can determine that on Mar. 2, 2012 for L4 in "Mountain View, Calif.", "dawn" is at 6:11 AM, "sunrise" is at 6:37 AM, "sunset" is at 6:04 PM, and "dusk" is at 6:30 PM. Then, based on the sunset/sunrise data, a visibility calculation can determine a not-visible interval for F4 at L4, in Mountain View, Calif., traveling in direction D from a time about one half hour before sunset, or about 5:34 PM, until dusk, or 6:30 PM.

As another example, a feature F5 that is relatively far from a road R that is visible during the day may not be visible while driving at night and using headlights. As such, the visibility information can indicate that visibility of F5 from various locations along R is relatively low during night hours and is relatively high during day hours. If night or day hours are defined based on sunset and sunrise, then the visibility data can use the environmental lighting information to determine visibility time intervals for F5.

Suppose that "day hours" are defined at "sunrise to sunset" and night hours are defined as "one minute after sunset to one minute before sunrise". Using these definitions, if F5 is also in Mountain View, Calif., then on Mar. 2, 2012, F5 has a visible time interval during day hours between 6:37 AM to 6:04 PM, and a not-visible time interval during night hours from 6:05 PM until 6:35 AM on Mar. 3, 2012, as sunrise in Mountain View, Calif. on Mar. 3, 2012 is at 6:36 AM.

As yet another example, certain features along a truck route can be occluded by large trucks that typically operate during business hours, but those same features are typically not occluded by vehicles operating along the truck route during non-business hours. As such, time of day visibility information can further be based on typically traffic flows for that time of day.

The above detailed description describes various features and functions of the disclosed systems, devices, and methods with reference to the accompanying figures. In the figures, similar symbols typically identify similarcomponents, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
   controlling, by a computing device, a vehicle on a road toward a particular feature;
   while controlling the vehicle on the road toward the particular feature, the computing device accessing stored data and retrieving visibility information from the stored data, wherein the visibility information includes data indicative of visibility of the particular feature from each of a plurality of positions on the road; and
   controlling, by the computing device, the vehicle to one of the plurality of positions on the road based on the retrieved visibility information.

2. The method of claim 1, wherein the stored data further includes a map associated with the visibility information.

3. The method of claim 2, wherein the visibility information is retrieved based on map coordinates.

4. The method of claim 1, wherein the plurality of positions on the road comprise a plurality of lanes.

5. The method of claim 4, wherein controlling, by the computing device, the vehicle to one of the plurality of positions on the road based on the retrieved visibility information comprises:
controlling the vehicle from a first lane to a second lane based on the retrieved visibility information indicating that the particular feature is more visible in the second lane than in the first lane.

6. The method of claim 1, wherein the plurality of positions on the road comprise a plurality of sub-lane positions within a lane.

7. The method of claim 1, wherein the particular feature is a traffic sign or traffic signal.

8. A non-transitory computer readable medium having instructions stored thereon that, when executed by a computing device, cause the computing device to perform functions, comprising:
controlling a vehicle on a road toward a particular feature;
while controlling the vehicle on the road toward the particular feature, accessing stored data and retrieving visibility information from the stored data, wherein the visibility information includes data indicative of visibility of the particular feature from each of a plurality of positions on the road; and
controlling the vehicle to one of the plurality of positions on the road based on the retrieved visibility information.

9. The non-transitory computer readable medium of claim 8, wherein the stored data further includes a map associated with the visibility information.

10. The non-transitory computer readable medium of claim 8, wherein the visibility information is retrieved based on map coordinates.

11. The non-transitory computer readable medium of claim 8, wherein the plurality of positions on the road comprise a plurality of lanes.

12. The non-transitory computer readable medium of claim 11, wherein controlling the vehicle to one of the plurality of positions on the road based on the retrieved visibility information comprises:
controlling the vehicle from a first lane to a second lane based on the retrieved visibility information indicating that the particular feature is more visible in the second lane than in the first lane.

13. The non-transitory computer readable medium of claim 8, wherein the plurality of positions on the road comprise a plurality of sub-lane positions within a lane.

14. The non-transitory computer readable medium of claim 8, wherein the particular feature is a traffic sign or traffic signal.

15. A computing device, comprising:
a processor;
a memory; and
instructions, stored in the memory, that when executed by the processor cause the computing device to perform functions comprising:
controlling a vehicle on a road toward a particular feature;
while controlling the vehicle on the road toward the particular feature, accessing stored data and retrieving visibility information from the stored data, wherein the visibility information includes data indicative of visibility of the particular feature from each of a plurality of positions on the road; and
controlling the vehicle to one of the plurality of positions on the road based on the retrieved visibility information.

16. The computing device of claim 15, wherein the computing device is located in the vehicle.

17. The computing device of claim 16, wherein the stored data is stored in the memory.

18. The computing device of claim 15, wherein the plurality of positions on the road comprising a plurality of lanes.

19. The computing device of claim 15, wherein the plurality of positions on the road comprise a plurality of sub-lane positions within a lane.

20. The computing device of claim 15, wherein the particular feature is a traffic sign or traffic signal.

* * * * *